(12) United States Patent
Basak et al.

(10) Patent No.: US 12,511,019 B2
(45) Date of Patent: *Dec. 30, 2025

(54) SYSTEMS AND METHODS FOR FACILITATING SELECTION OF TOOLS FOR MACHINE VISION JOBS

(71) Applicant: ZEBRA TECHNOLOGIES CORPORATION, Lincolnshire, IL (US)

(72) Inventors: Ankan Basak, Astoria, NY (US); Thomas Conticello, Saint James, NY (US); Christopher M. West, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/732,593

(22) Filed: Jun. 3, 2024

(65) Prior Publication Data

US 2024/0319850 A1  Sep. 26, 2024

Related U.S. Application Data

(63) Continuation of application No. 16/945,392, filed on Jul. 31, 2020, now Pat. No. 12,001,649.

(51) Int. Cl.
*G06F 3/0482* (2013.01)
*G06T 7/00* (2017.01)
*G06T 7/12* (2017.01)

(52) U.S. Cl.
CPC .......... *G06F 3/0482* (2013.01); *G06T 7/0004* (2013.01); *G06T 7/12* (2017.01)

(58) Field of Classification Search
CPC ....... G06F 3/0482; G06T 7/0004; G06T 7/12; G06T 2200/24; G06T 11/60; G06V 10/255; G06V 10/235; G06V 10/25; G06V 10/945; G06V 10/96
See application file for complete search history.

*Primary Examiner* — Pei Yong Weng

(57) ABSTRACT

Methods and systems for facilitating selection of tools for one or more machine vision jobs are disclosed herein. An example method may be performed by one or more processors and includes displaying, via a display screen, an interactive graphical user interface (GUI) of an application, the application configured to generate job scripts for imaging devices to execute and the application operating in a job construction mode. The method also includes displaying an image within the GUI and detecting a selection of a portion of the image. The method further includes analyzing the portion of the image to determine a corresponding tool for processing the portion of the image and adding the corresponding tool to a job flow of the machine vision job.

20 Claims, 7 Drawing Sheets

SYSTEMS AND METHODS FOR FACILITATING SELECTION OF TOOLS FOR MACHINE VISION JOBS

CROSS-REFERENCE TO RELATED APPLICATIONS

This disclosure is a continuation of U.S. patent application Ser. No. 16/945,392, filed on Jul. 31, 2020, and incorporated herein by reference in its entirety.

BACKGROUND

To configure a machine vision job, a user typically must interact with software to indicate which image capture and/or analysis tools are to be included in the machine vision job, and to specify the settings of such tools. For example, a user may envision a particular outcome that they would like to achieve using a machine vision tool. However, the user may not be aware of which tool of a suite of tools included in machine vision software will achieve the particular outcome. As a result, the user may need to spend extensive time and may need to perform multiple navigation interactions (e.g., mouse clicks) within the machine vision software to find and select an appropriate tool. Further, even if the user has an idea of which tool may be appropriate, it still may take extensive time and navigation interactions to locate the tool within the suite of tools.

Moreover, the user may not select an appropriate tool for achieving the user's desired result. The user may inadvertently select the wrong tool while navigating through a large list of tools, or the user's subjective evaluation of the tools and/or images to be analyzed may be incorrect. As a result, if the machine vision job including the inappropriate tool is applied in practice, the machine vision job may not perform to the desired standard and may produce inaccurate results. For example, if the machine vision job is used to inspect products on an assembly line, defective products may pass inspection due to the inappropriate tools and/or products meeting quality standards may be incorrectly flagged as defective, resulting in inefficiencies and additional costs.

Accordingly, there is a need for improved methods of facilitating selection of tools for machine vision jobs.

SUMMARY

In an embodiment, the present invention is a method for facilitating selection of tools for one or more machine vision jobs. The method includes displaying, by one or more processors via a display screen, an interactive graphical user interface (GUI) of an application, the application configured to generate job scripts for imaging devices to execute and the application operating in a job construction mode. The method also includes displaying, by the one or more processors within the interactive GUI, an image and detecting, by the one or more processors, a selection of the a portion of the image. The method further includes analyzing, by the one or more processors, the portion of the image to determine a corresponding tool for processing the portion of the image and displaying, by the one or more processors within the interactive GUI, a user-selectable option to add the corresponding tool to a machine vision job.

In a variation of this embodiment, the method includes detecting, by the one or more processors, a selection of the user-selectable option to add the corresponding tool to the machine vision job; adding, in response to the selection of the user-selectable option, the corresponding tool to a job flow of the machine vision job; and displaying, by the one or more processors within the interactive GUI, the corresponding tool within the job flow. The method may further include detecting, by the one or more processors, a selection of a second user-selectable option to deploy the machine vision job; in response to detecting the selection of the second user-selectable option, generating a job script an imaging device can execute to perform the machine vision job, the job script including computer-readable instructions corresponding to tools within the job flow, wherein the tools include the corresponding tool; and transmitting the job script to the imaging device for execution.

Moreover, in variations of this embodiment, analyzing the portion of the image includes analyzing the portion of the image using pixel analysis. Analyzing the portion of the image may include determining whether the portion of the image includes a barcode. In response to determining that the portion of the image includes a barcode, the method may include determining that the corresponding tool corresponds to a barcode scanning tool. In response to determining that the portion of the image does not include a barcode, the method may include determining that the corresponding tool corresponds to at least one of a pattern matching tool or an edge detection tool.

Furthermore, in variations of this embodiment, analyzing the portion of the image may include detecting at least one edge within the portion of the image and determining that the corresponding tool corresponds to an edge detection tool. Analyzing the portion of the image may include performing edge detection on the portion of the image and determining whether the image depicts a two-dimensional or three-dimensional object. In response to determining that the image depicts a two-dimensional object, the method may include determining that the corresponding tool corresponds to an edge detection tool. In response to determining that the image depicts a three-dimensional object, the method may include determining that the corresponding tool corresponds to a pattern matching tool.

In another embodiment, the present invention is a computer system for facilitating selection of tools for one or more machine vision jobs. The computer system includes one or more processors and a non-transitory program memory communicatively coupled to the one or more processors and storing executable instructions that, when executed by the one or more processors, cause the computer system to display, via a display screen, an interactive GUI of an application, the application configured to generate job scripts for imaging devices to execute and the application operating in a job construction mode. The instructions also cause the computer system to display, within the interactive GUI, an image and detect a selection of a portion of the image. The instructions further cause the computer system to analyze the portion of the image to determine a corresponding tool for processing the portion of the image and display, within the interactive GUI, a user-selectable option to add the corresponding tool to a machine vision job.

In a further embodiment, the present invention is a tangible, non-transitory computer-readable medium storing executable instructions for facilitating selection of tools for one or more machine vision jobs that, when executed by at least one processor of a computer system, cause the computer system to display, via display, via a display screen, an interactive GUI of an application, the application configured to generate job scripts for imaging devices to execute and the application operating in a job construction mode. The instructions also cause the computer system to display, within the interactive GUI, an image and detect a selection of a portion of the image. The instructions further cause the computer system to analyze the portion of the image to determine a corresponding tool for processing the portion of the image and display, within the interactive GUI, a user-selectable option to add the corresponding tool to a machine vision job.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
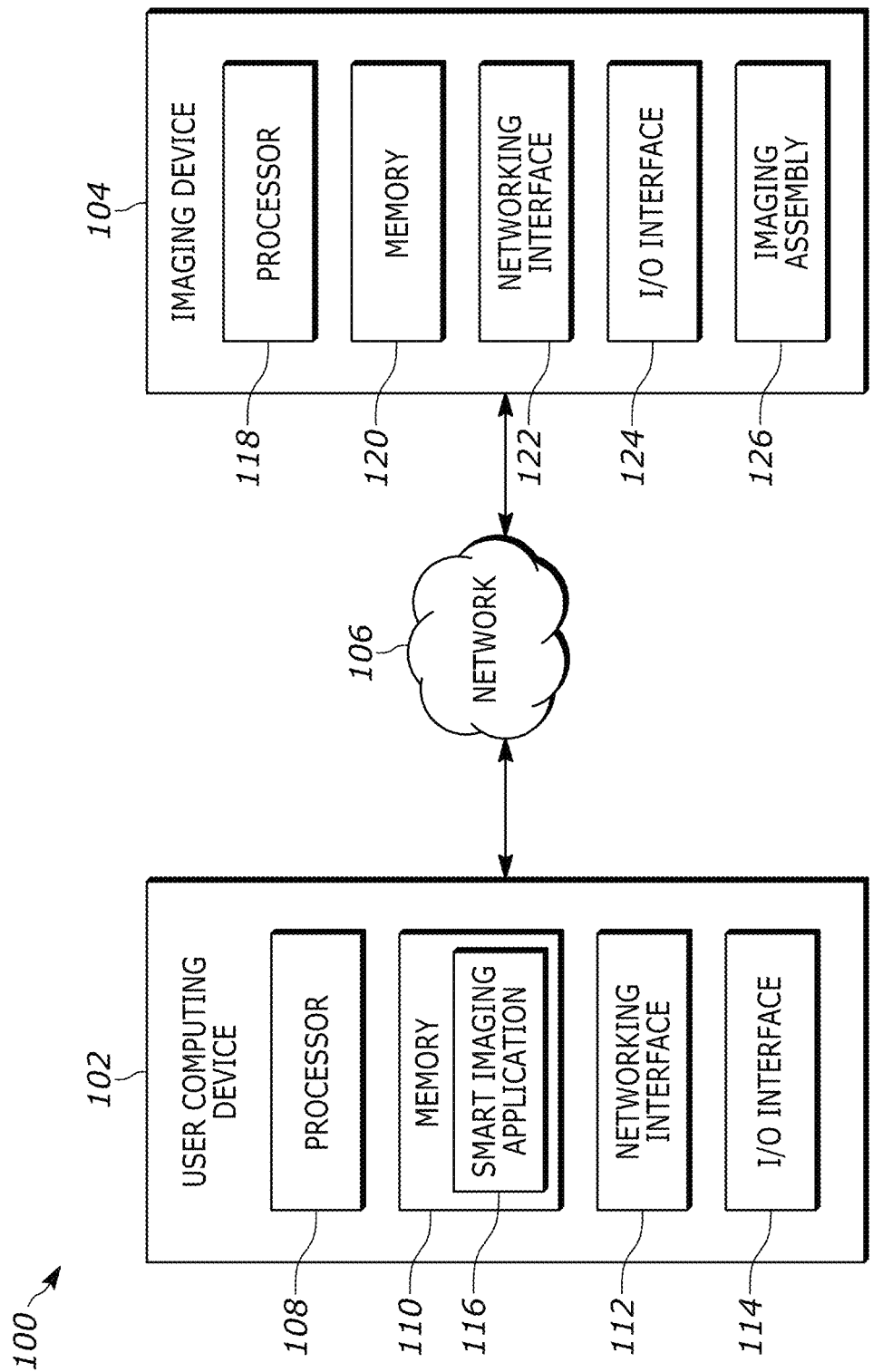
FIG. 1 is an example system for facilitating selection of tools for a machine vision job, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present disclosure provides techniques to facilitate selection of tools for one or more machine vision jobs. More specifically, the techniques of the present disclosure include automatically analyzing a designated portion of an image to determine a recommended tool for analyzing the portion of the image. Advantageously, a computing system implementing the techniques of this disclosure recommends a tool without the need for subjective human input. Applying the techniques of the present disclosure results in reduced required interactions between the user and computing system, as the user does not need to navigate through a suite of tools to locate an appropriate tool. Further, using the techniques of the present disclosure reduces the probability that an inappropriate tool is added to a machine vision job, reducing costs and inefficiencies for implementing machine vision.

FIG. 1 illustrates an example smart imaging system 100 configured to analyze pixel data of an image of a target object to optimize one or more imaging settings for a machine vision job, in accordance with various embodiments disclosed herein. In the example embodiment of FIG. 1, the smart imaging system 100 includes a user computing device 102 and an imaging device 104 communicatively coupled to the user computing device 102 via a network 106. Generally speaking, the user computing device 102 is configured to enable a user/operator to create a machine vision job for execution on the imaging device 104. Once created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output interface 114, and a smart imaging application 116.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an input/output interface 124, and an imaging assembly 126. The imaging assembly 126 may include a digital camera and/or digital video camera for capturing or taking digital images and/or frames. Each digital image may comprise pixel data that may be analyzed by one or more tools each configured to perform a machine vision task, as described herein. The digital camera and/or digital video camera of, e.g., the imaging assembly 126 may be configured to take, capture, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 and the imaging device 104 via wireless communications based on any one or more of various wireless standards, including by non-limiting example, IEEE 802.11a/b/c/g (WIFI), the BLUETOOTH standard, or the like.

The input/output interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The input/output interfaces 114, 124 may also include input/output components (e.g., ports, capacitive or resistive touch sensitive input panels, keys, buttons, lights, LEDs), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
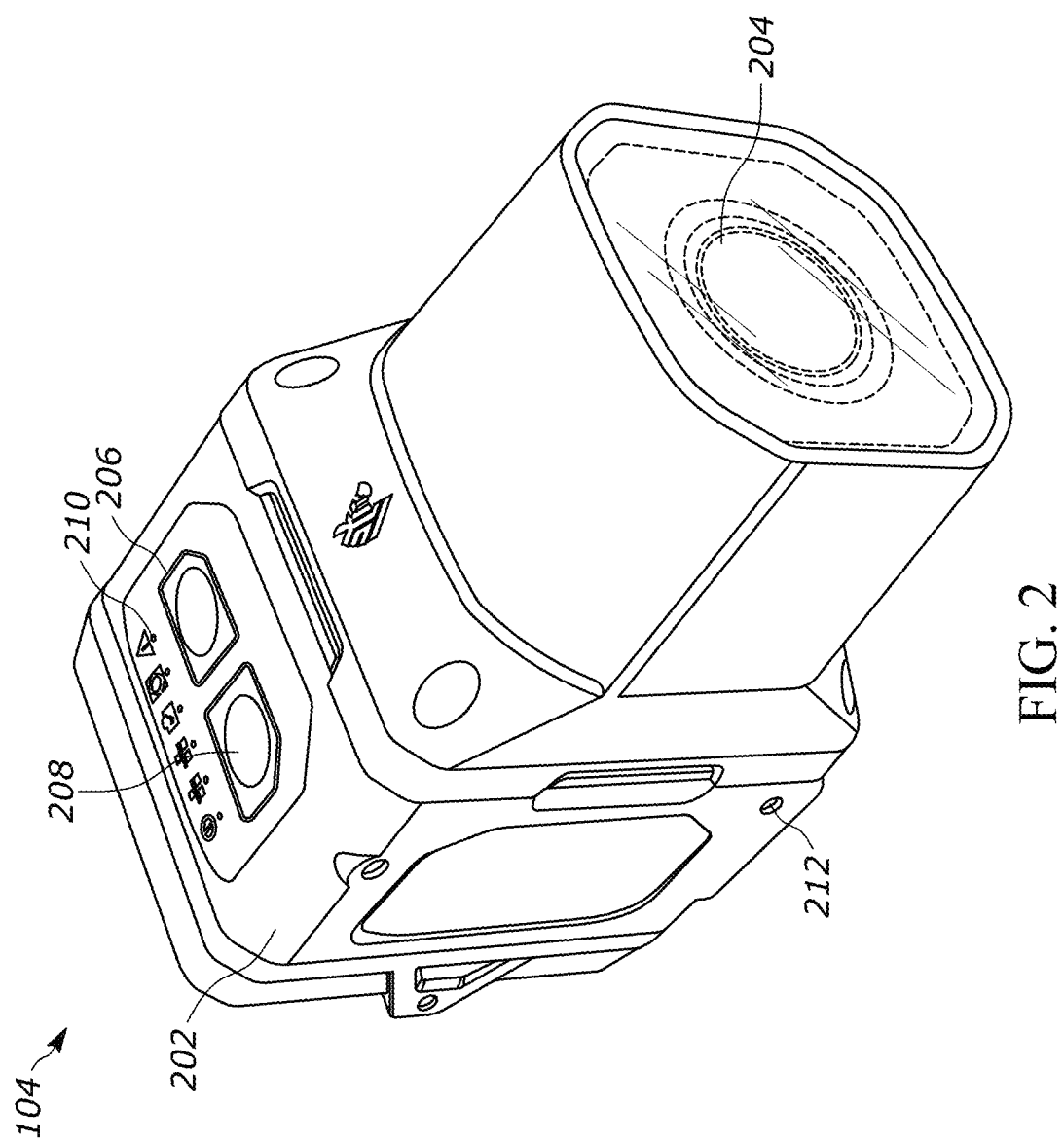
FIG. 2 is a perspective view of the imaging device of FIG. 1, in accordance with embodiments described herein.

FIG. 2 is a perspective view of the imaging device 104 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
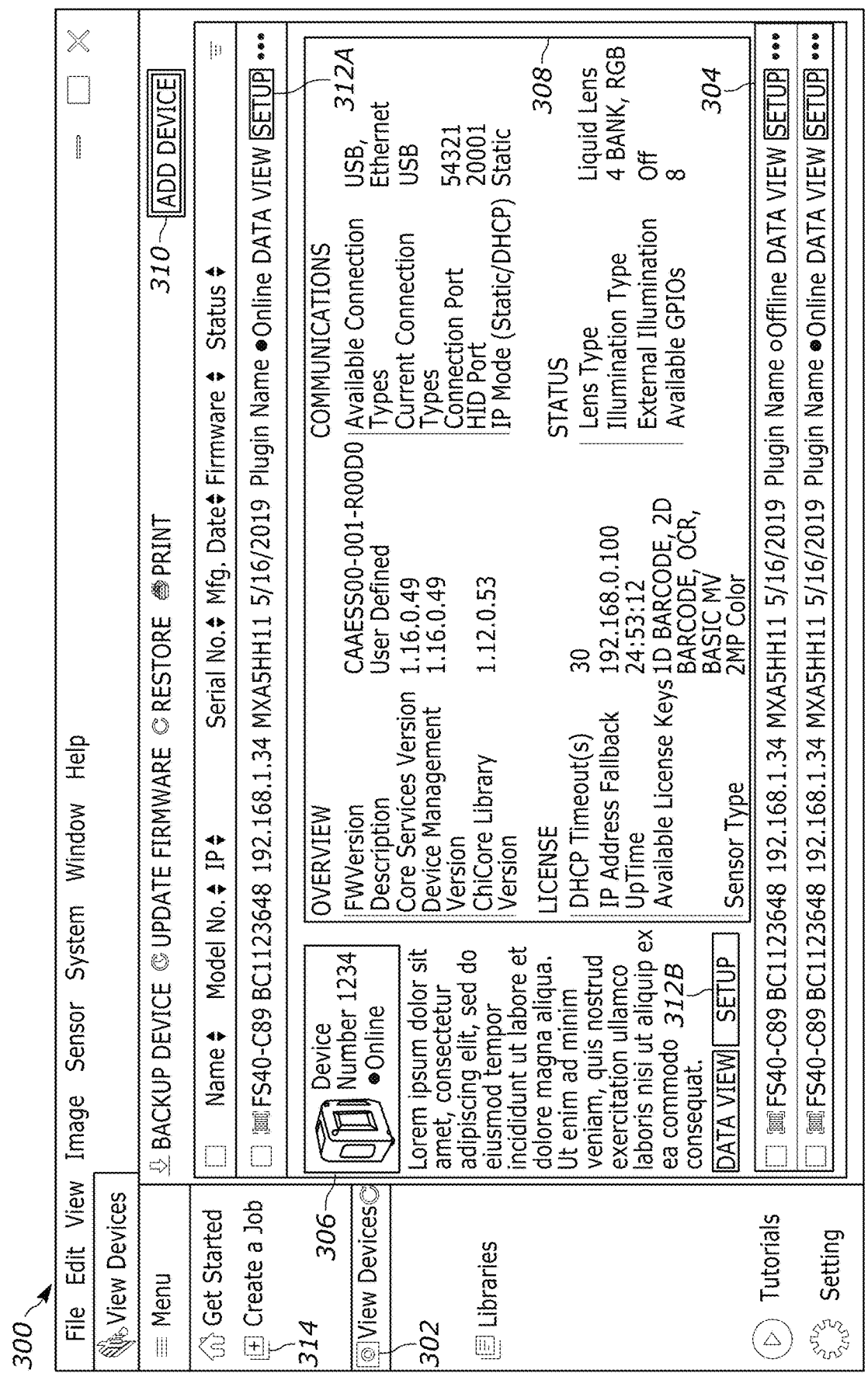
FIG. 3 depicts an example application interface utilized to manage imaging devices and construct machine vision jobs for execution by the imaging devices, in accordance with embodiments described herein.

FIG. 3 depicts an example application interface 300 utilized to manage imaging devices and construct machine vision jobs, in accordance with embodiments described herein. Generally, the example application interface 300 may represent an interface of a smart imaging application (e.g., smart imaging application 116) a user may access via a user computing device (e.g., user computing device 102). The example application interface 300 (as well as application interfaces 400, 420, and 500, or any other application interface of the smart imaging application 116) may be an interactive GUI displayed on a display screen (e.g., included in the I/O interfaces 114, 124) that the user may interact with to make selections relating to managing imaging devices and constructing machine vision jobs (e.g., by interacting with I/O interfaces 114, 124). Specifically, the example application interface 300 may present a user with a list of all available devices (e.g., imaging device 104) to which a user may connect and/or construct machine vision jobs when the user selects the view devices tab 302. From here, the user may view the device selection list 304, which may display each connected device a user may access, and may further include information such as, but without limitation, a device name, a device model number, an IP address corresponding to the device, a device serial number, a device manufacture date, a device firmware status, a device online status, and/or any other suitable indication. The example application interface 300, for example, may be displayed by the smart imaging application 116 when the smart imaging application 116 is operating in a device management mode.

The user may then select a device, indicated by the selected device indicator 306, from the device selection list 304, intending to configure and/or otherwise view some setting of the device. The selected device indicator 306 may display the device name and the device online status, and may additionally or alternatively include any other information related to the device. Upon selection of the device indicated in the selected device indicator 306, the smart imaging application 116 may additionally display a selected device configuration listing 308 within the example application interface 300. The selected device configuration listing 308 may include a variety of information concerning the selected device such as, but without limitation, a selected device general overview (e.g., firmware updates, library updates, etc.), a selected device licenses overview (e.g., DHCP timeout(s), IP address fallback, etc.), a selected device communications overview (e.g., available connection types, current connection type, etc.), a selected device status overview (e.g., lens type, illumination type, etc.), and/or any other suitable information or combinations thereof.

In addition, the selected device configuration listing 308 may include an indication of the machine vision jobs executed, stored, and/or otherwise associated with the selected device. For example, the selected device configuration listing 308 may indicate that the selected device is configured to operate in accordance with a first machine vision job that was uploaded to the selected device at a first time (e.g., "Uploaded at 10:00 AM on Oct. 10, 2018"). The selected device configuration listing 308 may additionally indicate that the first machine vision job includes a first configuration of one or more image settings corresponding to the selected device and a second configuration of the one or more image settings corresponding to the selected device. Each of the one or more image settings included in the first and second configuration may additionally be displayed in the selected device configuration listing 308.

The example application interface 300 may additionally include an add device function 310 to allow a user to add additional devices, for example, not found in the device selection list 304. If a user acquires a new device, such as an imaging device (e.g., imaging device 104) the user may click, swipe, and/or otherwise interact with the add device function 310 to add the new device to the device selection list 304. Moreover, once the new device has been added, the user may interact with the setup device functions 312A/B to configure and/or otherwise view the settings corresponding to the new device. Accordingly, the user may interact with the setup device functions 312A/B at any time after a device is added to the device selection list 304 to adjust, view, or otherwise manage the device settings.

Additionally or alternatively, when the user interacts with the setup device functions 312A/B the smart imaging application 116 may generate/render a new interface allowing the user to configure a machine vision job for the selected device (e.g., as indicated by the selected device indicator 306). The user may additionally cause the smart imaging application 116 to generate/render the new interface by interacting with the job creation tab 314. In this manner, the user may transition away from the example application interface 300 to configure a machine vision job corresponding to the selected device through an interaction with either the setup device function 312A/B or the job creation tab 314.

Figure 4A:
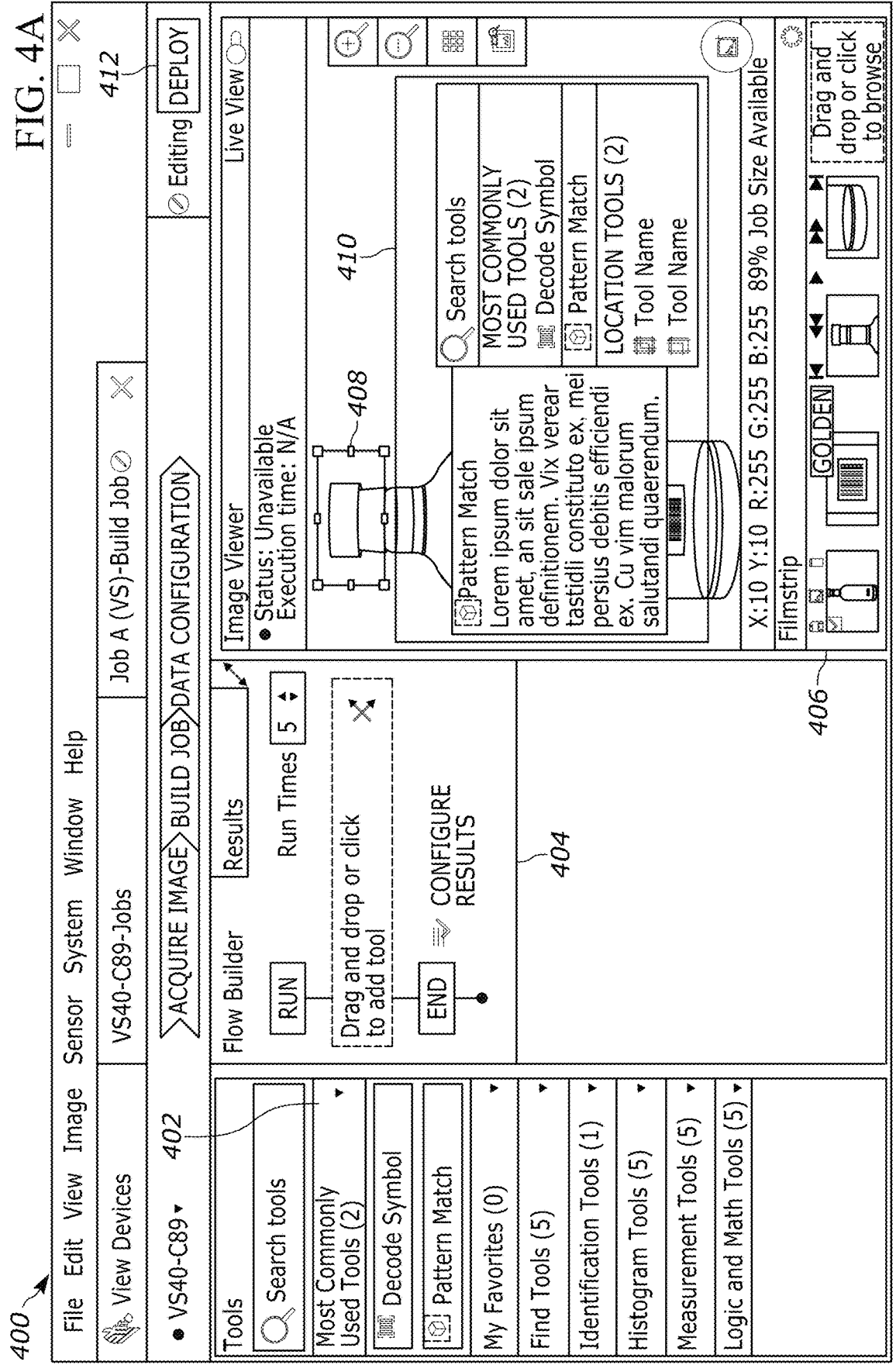
FIGS. 4A-4B depict additional application interfaces utilized to construct machine vision jobs, in accordance with embodiments described herein.
Figure 4B:
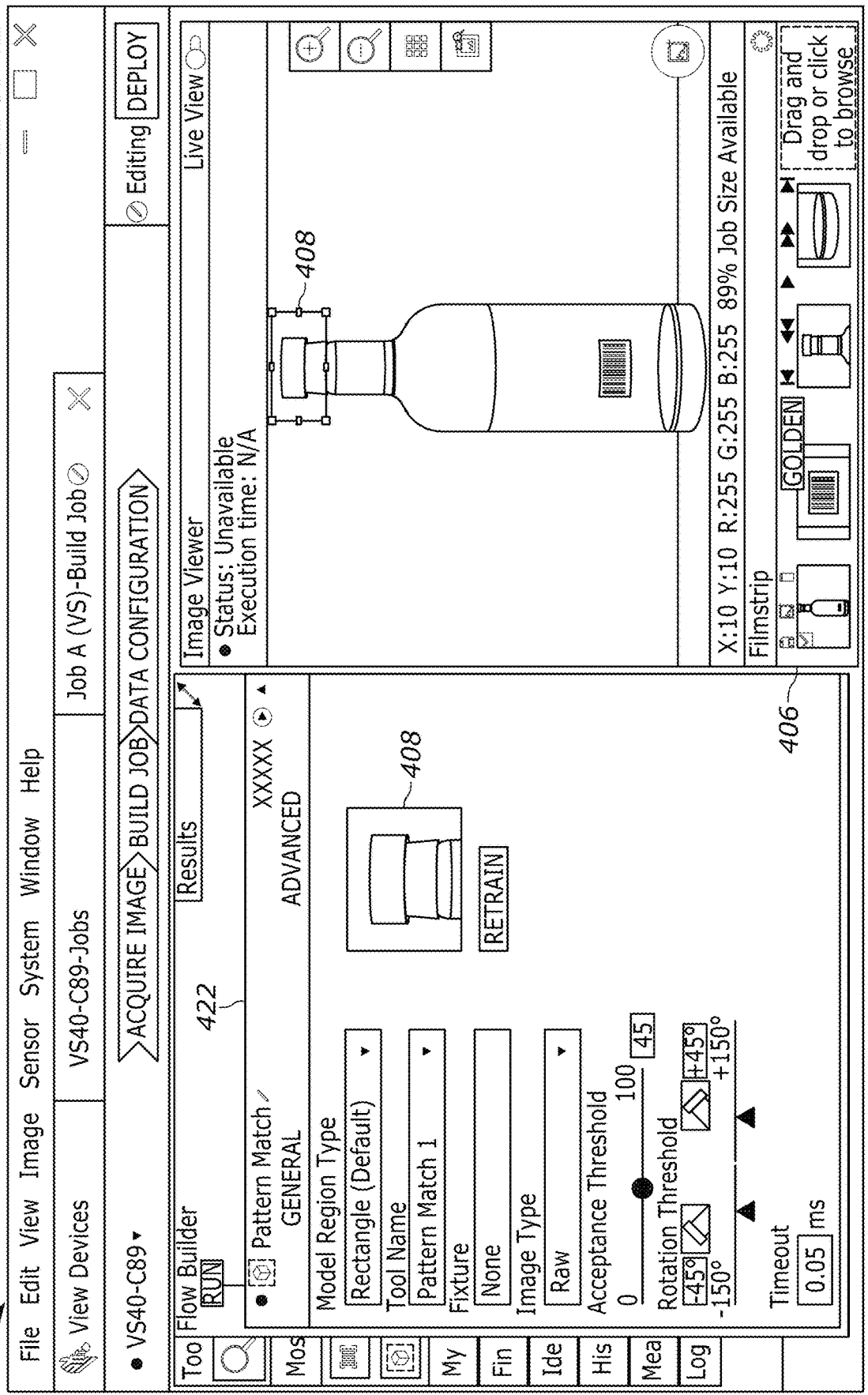

FIGS. 4A-4B depict additional application interfaces utilized to construct machine vision jobs, in accordance with embodiments described herein. For example, after interacting with the job creation tab (e.g., job creation tab 314) and/or the setup device function (e.g., setup device function 312A/B), the smart imaging application (e.g., smart imaging application 116) may transition the user to a job construction application interface 400, depicted in FIG. 4A. The job construction application interface 400, for example, may be displayed by the smart imaging application 116 when the smart imaging application 116 is operating in a job construction mode. Generally, the user may utilize the job construction application interface 400 to organize and configure machine vision tools into a particular sequence that defines a respective machine vision job. The user may additionally utilize the job construction application interface 400 to upload the respective machine vision job to an imaging device (e.g., imaging device 104) for interpretation and execution.

To build a machine vision job, the user may select tools configured to perform machine vision functions. The user may select a tool by clicking, swiping, dragging, and/or otherwise interacting with the available tool(s) list 402. Each tool may be included in drop-down list (as illustrated) of the available tool(s) list 402, or may be plainly visible to the user on the available tool(s) list 402. In any event, the user may select and move a desired tool over to the job flow builder section 404 to begin constructing a machine vision job. In the job flow builder section 404, the user may organize each selected tool into an optimal/preferential order, i.e., a job flow, based upon the requirements of the machine vision job. Further, the user may configure each tool to more accurately satisfy the requirements of the machine vision job. For example, the user may configure a barcode scanning tool selected from the available tool(s) list 402 to scan over a larger/smaller area of image(s) captured by the selected device (e.g., imaging device 104).

The user may also select a representative image from the job filmstrip 406 in order to complete configuration of the selected tools. The job filmstrip 406 may include real-time images from the selected device, or they may be stored images (e.g., in the one or more memories 110, 120) that are representative of an ideal image capture for the machine vision job. Additionally or alternatively, the smart imaging application 116 may automatically populate the job filmstrip 406 based on the selected tools in the job flow builder section 404. Once selected, the representative image may appear in a larger section above the job filmstrip 406 that enables the user to place tool ROIs 408 over the representative image. A tool ROI 408 indicates a region of the representative image that the tool represented by the tool ROI 408 may analyze using a machine vision technique. For example, if the tool ROI 408 represents the ROI of a barcode scanning tool, then the barcode scanning tool will scan for a barcode within the region of the representative image indicated by the tool ROI 408.

If the user cannot decide on an appropriate tool for a machine vision job, the user may click, swipe, and/or otherwise interact with the job construction application interface 400 and the smart imaging application 116 may generate/render the tool information region 410. Generally speaking, the smart imaging application 116 may provide a user with commonly used tool suggestions, tool type suggestions, descriptions of each tool included in the tool information region 410, and/or any other suitable information or combinations thereof. For example, the smart imaging application 116 may provide a user with an option in the tool information region 410 to search for a particular tool by typing, speaking, and/or otherwise indicating a name, function, or other representative quality of the tool. Details regarding how the smart imaging application 116 may provide a user with suggested tools are discussed below with reference to FIG. 5.

Once the user has selected and/or ordered one or more tools, and thus created a machine vision job, the job deployment toggle 412 allows a user to upload the machine vision job to the selected device (e.g., imaging device 104). The smart imaging application 116 may register the user interaction with the job deployment toggle 412 and convert the machine vision job to a job file that is then transmitted (e.g., via network 106) to the selected device. The machine vision job may also be stored in memory (e.g., one or more memories 110, 120). The user may additionally toggle the uploaded machine vision job into active/inactive use by interacting with the job deployment toggle 412. Thereafter, the user may adjust configurations/settings associated with the machine vision job by accessing the machine vision job and interacting with the one or more tools in the available tool(s) list 402 and/or the job builder flow section 404, the images in the job filmstrip 406, the tool ROIs 408, and/or by the options within the tool information region 410.

In various embodiments, the job construction application interface 400 allows a user to construct multiple machine vision jobs to be executed in sequence for a selected device (e.g., imaging device 104). For example, the job construction application interface 400 may allow a user to construct a first machine vision job comprising a first set of tools that adjust the configuration of the selected device to a first configuration. The first configuration may include one or more imaging settings of the selected device such as, without limitation, an aperture size, an exposure length, an ISO value, and/or any other suitable value or combinations thereof. The job construction application interface 400 may also allow the user to construct a second machine vision job comprising a second set of tools that adjust the configuration of the selected device to a second configuration. The second set of tools may be the same or different from the first set of tools, and the second configuration may be the same or different from the first configuration. In any event, the smart imaging application 116 may transmit both machine vision jobs to the selected device, and may store both machine vision jobs in memory (e.g., one or more memories 110, 120). Thereafter, the selected device may sequentially perform the first machine vision job and the second machine vision job automatically, e.g., may capture at least one image in accordance with the first configuration, automatically adjust to the second configuration, and capture at least one image in accordance with the second configuration.

However, the user may desire to configure the specific functionality of each tool included in the job builder flow section 404. Thus, the user may interact with a tool in the job builder flow section 404 or other area of the job construction application interface 400, and the smart imaging application 116 may generate/render the tool configuration application interface 420. Turning to FIG. 4B, the tool configuration application interface 420, for example, may be displayed by the smart imaging application 116 when the smart imaging application 116 is operating in a job construction mode. The tool configuration application interface 420 may enable a user to customize the specific functionality of each tool included in a machine vision job via the user-selectable options present in the tool configuration region 422. For example, the tool configuration region 422 may include tool configuration options such as, without limitation, a tool model region type, a tool name, a tool fixture, a tool image type, a tool acceptance threshold, a tool rotation threshold, a tool timeout, and/or any other suitable tool configuration option. In this manner, the smart imaging application 116 allows a user to fully customize the selection, order, and individual configuration of each tool included in a machine vision job.

Figure 5:
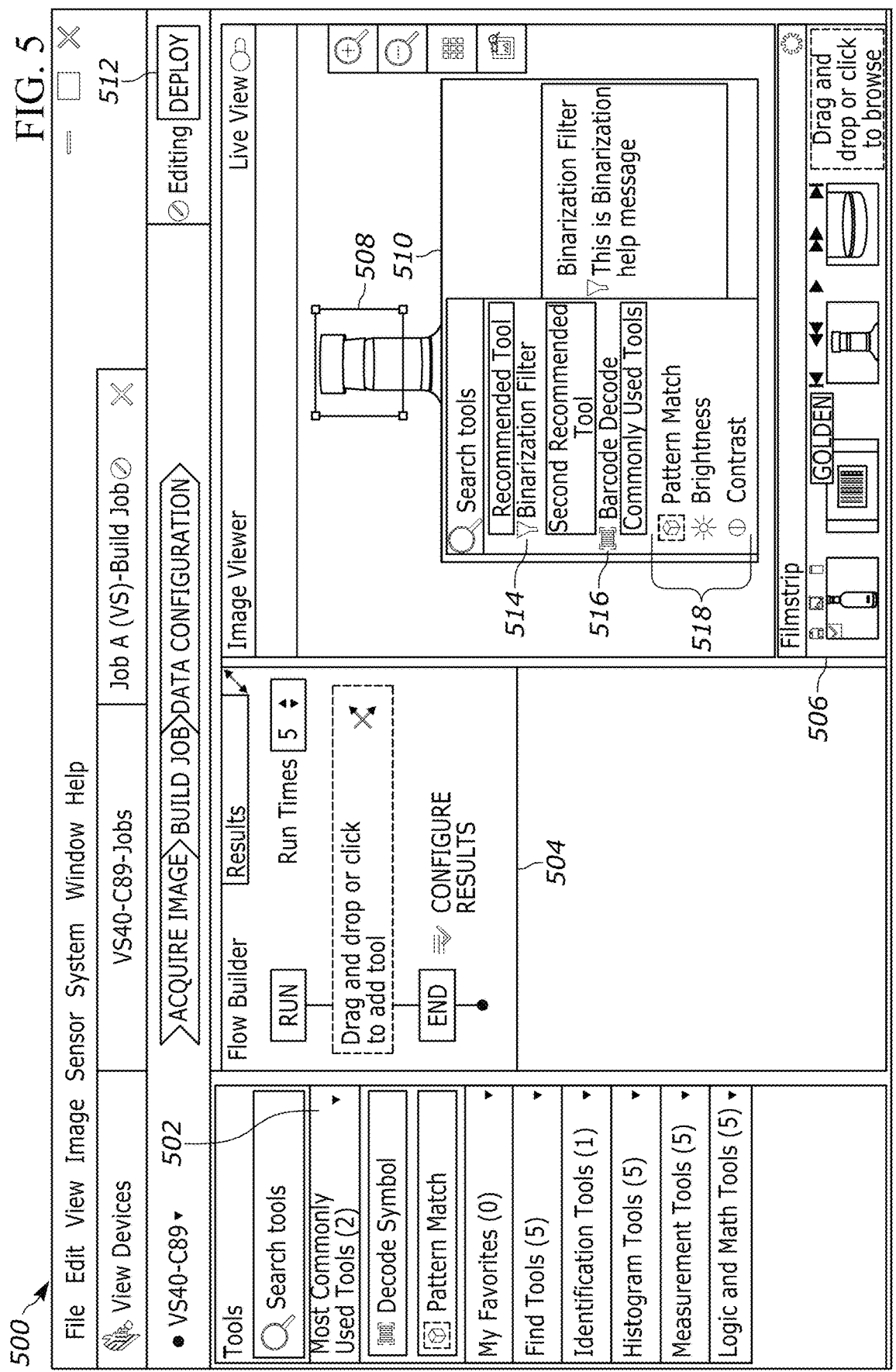
FIG. 5 depicts an additional application interface utilized to automatically suggest a corresponding tool, in accordance with embodiments described herein.

FIG. 5 depicts an additional application interface utilized to automatically suggest a corresponding tool appropriate for analyzing an image, in accordance with embodiments described herein. A job construction application interface 500 may be generally similar to the job construction application interface 400, and may be displayed by the smart imaging application 116 when the smart imaging application 116 is operating in a job construction mode. The job construction application interface 500 may include an available tool(s) list 502, job flow builder section 504, job filmstrip 506, and job deployment toggle 512 similar to the available tool(s) list 402, job flow builder section 404, job filmstrip 406, and job deployment toggle 412, respectively. As discussed with reference to FIG. 4A, the user may select a representative image from the job filmstrip 506, which causes the representative image to appear in a larger section above the job filmstrip 506. The user may interact with the job construction application interface 500 to indicate an ROI 508 of the representative image. For example, the user may indicate the ROI 508 by clicking and dragging or drawing a box around a portion of the representative image using the job construction application interface 500, or by swiping or otherwise interacting with the job construction application interface 500. The ROI 508 indicates to the smart imaging application 116 a portion of the image which the user would like to analyze using a tool of the smart imaging application 116.

After the smart imaging application 116 detects that the user has selected a portion of the image by indicating the ROI 508, the smart imaging application 116 may analyze the portion of the representative image included in the ROI 508 to determine a corresponding tool (also referred to herein as an appropriate, recommended, or suggested tool) for processing the portion of the image. A corresponding tool is a tool that the smart imaging application 116 recommends for processing the image (i.e., the corresponding tool "corresponds" to the image), as discussed with reference to several examples below. Such a tool may be "corresponding" if the tool has a high probability, relative to other available tools, of being suitable for analyzing the image. The smart imaging application 116 may analyze the portion of the representative image using any suitable image analysis technique, such as pixel analysis, discussed below. Based on features identified in the image, the smart imaging application 116 can recommend a tool that is suitable for analyzing those features. For instance, a barcode scanning tool may be a corresponding tool if the image includes a barcode or Quick Response (QR) code. An edge detection tool may be a corresponding tool based on the number of edges included in the image (e.g., if the image includes one or two edges) or if the image depicts a two-dimensional object. A pattern matching tool may be a corresponding tool if the image includes a detectable pattern, depicts a three-dimensional object, and/or if more than two edges are detected in the image.

Pixel analysis includes analyzing pixel data of the portion of the representative image. Pixel data includes individual points or squares of data within an image, where each point or square represents a single pixel within an image. Each pixel may be a specific location within an image. In addition, each pixel may have a specific color (or lack thereof). Pixel color may be determined by a color format and related channel data associated with a given pixel. For example, a popular color format includes the red-green-blue (RGB) format having red, green, and blue channels. That is, in the RGB format, data of a pixel is represented by three numerical RGB components (Red, Green, Blue), that may be referred to as referred to as a channel data, to manipulate the color of pixel's area within the image. In some implementations, the three RGB components may be represented as three 8-bit numbers for each pixel. Three 8-bit bytes (one byte for each of RGB) is used to generate 24 bit color. Each 8-bit RGB component can have 256 possible values, ranging from 0 to 255 (i.e., in the base 2 binary system, an 8 bit byte can contain one of 256 numeric values ranging from 0 to 255). This channel data (R, G, and B) can be assigned a value from 0 to 255 and be used to set the pixel's color. For example, three values like (250, 165, 0), meaning (Red=250, Green=165, Blue=0), can denote one Orange pixel. As a further example, (Red=255, Green=255, Blue=0) means Red and Green, each fully saturated (255 is as bright as 8 bits can be), with no Blue (zero), with the resulting color being Yellow. As a still further example, the color black has an RGB value of (Red=0, Green=0, Blue=0) and white has an RGB value of (Red=255, Green=255, Blue=255). Gray has the property of having equal or similar RGB values. So (Red=220, Green=220, Blue=220) is a light gray (near white), and (Red=40, Green=40, Blue=40) is a dark gray (near black).

In this way, the composite of three RGB values creates the final color for a given pixel. With a 24-bit RGB color image using 3 bytes there can be 256 shades of red, and 256 shades of green, and 256 shades of blue. This provides 256×256×256, i.e., 16.7 million possible combinations or colors for 24 bit RGB color images. In this way, the pixel's RGB data value shows "how much" of each of Red, and Green, and Blue the pixel is comprised of. The three colors and intensity levels are combined at that image pixel, i.e., at that pixel location on a display screen, to illuminate a display screen at that location with that color. It is to be understood, however, that other bit sizes, having fewer or more bits, e.g., 10-bits, may be used to result in fewer or more overall colors and ranges. Further, it is to be understood that the pixel data may contain additional or alternative color format and channel data. For example, the pixel data may include color data expressed in a hue saturation value (HSV) format or hue saturation lightness (HSL) format.

Analyzing the portion of the representative image may further include performing edge detection, pattern recognition, object detection, or the like, which may be performed using pixel analysis.

As one example of how the smart imaging application 116 may determine a corresponding tool, analyzing the portion of the representative image may include determining whether the portion of the representative image includes a barcode or QR code. If so, then the smart imaging application 116 may determine that the corresponding tool appropriate for analyzing the portion of the representative image corresponds to a barcode scanning tool. Otherwise, the smart imaging application 116 may determine that the corresponding tool corresponds to a different tool, such as a pattern matching tool, edge detection tool, semantic segmentation tool, object detection tool, a binzarization filter, or object tracking tool As another example, analyzing the portion of the representative image may include detecting at least one edge within the portion of the representative image and, in response, determining that the corresponding tool corresponds to an edge detection tool. More generally, analyzing the portion of the representative image may include performing edge detection. Based on the edge detection, the smart imaging application 116 may determine whether the portion of the image depicts a two-dimensional object or a three-dimensional object. In some embodiments, the smart imaging application 116 may determine whether the portion of the image depicts a two-dimensional or a three-dimensional object using a suitable image analysis technique in addition to or instead of edge detection. If the portion of the image depicts a two-dimensional object, then the smart imaging application 116 may determine that the corresponding tool corresponds to an edge detection tool. If the portion of the image depicts a three-dimensional object, then the smart imaging application 116 may determine that the corresponding tool corresponds to a pattern matching tool.

As a further example, analyzing the portion of the representative image may include detecting colors included in the image portion and, in response to detecting more than two colors, determining that the corresponding tool corresponds to a binarization filter, which may convert a multi-color or grey-scale image to black and white.

If the smart imaging application 116 is unable to determine a corresponding tool (e.g., because multiple tools have similar probabilities of being a suitable tool, or because no tool appears most suitable for analyzing the features of the image), then the smart imaging application 116 may recommend a default tool, such as a pattern matching tool, as the corresponding tool. In some embodiments, a user may designate a default tool by interacting with an application interface of the smart imaging application 116.

The smart imaging application 116 may render a tool information region 510, which may include a list of suggested or recommended tools. The "most" appropriate tool (e.g., a tool that the smart imaging application 116 determines has the highest probability, relative to the other available tools, of being a corresponding tool for analyzing the portion of the image depicted in the ROI 508) may be listed at or near the top of the tool information region 510 as a recommended tool 514. In the example of FIG. 5, the recommended tool 514 is a binarization filter. In addition to or instead of placing the recommended tool 514 at or near the top of the tool information region 510, the job construction application interface 500 may highlight or otherwise indicate to the user that the recommended tool 514 is the "most" appropriate tool. For example, the job construction application interface 500 may label the recommended tool 514 as a recommended tool using a textual annotation, may highlight the recommended tool 514 using a color or graphical annotation, or may present the recommended tool 514 using a different font color.

In addition to determining a "most" appropriate tool, the smart imaging application 116 may, based on analyzing the portion of the image depicted in the ROI 508, determine other recommended tools for processing the portion of the image. For example, the smart imaging application 116 may determine a second recommended tool 516 that may also correspond to the image and be appropriate for processing the image, and display the second recommended tool 516 below the recommended tool 514. The second recommended tool 516 may be a "second-best" appropriate tool for processing the portion of the image (e.g., may have a second-highest probability relative to the other available tools of being an appropriate tool). Furthermore, the smart imaging application 116 may display one or more commonly used tools 518 in addition to the recommended tool 514. The commonly used tool(s) 518 may or may not be based on analysis of the portion of the image, and may be tools that the user of the smart imaging application 116 commonly utilizes, or that users more generally of the smart imaging application 116 or smart imaging applications commonly utilize.

The recommended tool 514 may be displayed on the job construction application interface 500 as a user-selectable option. The user may select the user-selectable option corresponding to the recommended tool 514 to add the recommended tool 514 to a job flow of a machine vision job. For example, after the user selects the recommended tool 514, the recommended tool 514 may appear in the job flow builder section 504. After the smart imaging application 116 detects selection of the recommended tool 514, the job construction application interface 500 may display options to configure to the recommended tool 514. The user may interact with these options to customize the settings of the recommended tool 514 for the user's particular machine vision job. Similarly, the second recommended tool 516 and/or the commonly used tool(s) 518, if determined and rendered on the job construction application interface 500, may also be displayed as similar user-selectable options.

After the user has selected and/or ordered one or more tools, which may include one or more of the recommended tool 514, the second recommended tool 516, or one or more of the commonly used tools 518, the user may select the job deployment toggle 512 to upload or otherwise deploy the machine vision job to a selected device (e.g., imaging device 104). After detecting selection of the job deployment toggle 512, the smart imaging application 116 may convert the machine vision job to a job file that is then transmitted (e.g., via network 106) to the selected job, as discussed above. Converting the machine vision job may include generating a job script that the selected imaging device can execute to perform the machine vision job. The job script includes instructions corresponding to the tools within the job flow, including the recommended tool 514 if the user previously selected the recommended tool 514.

Figure 6:
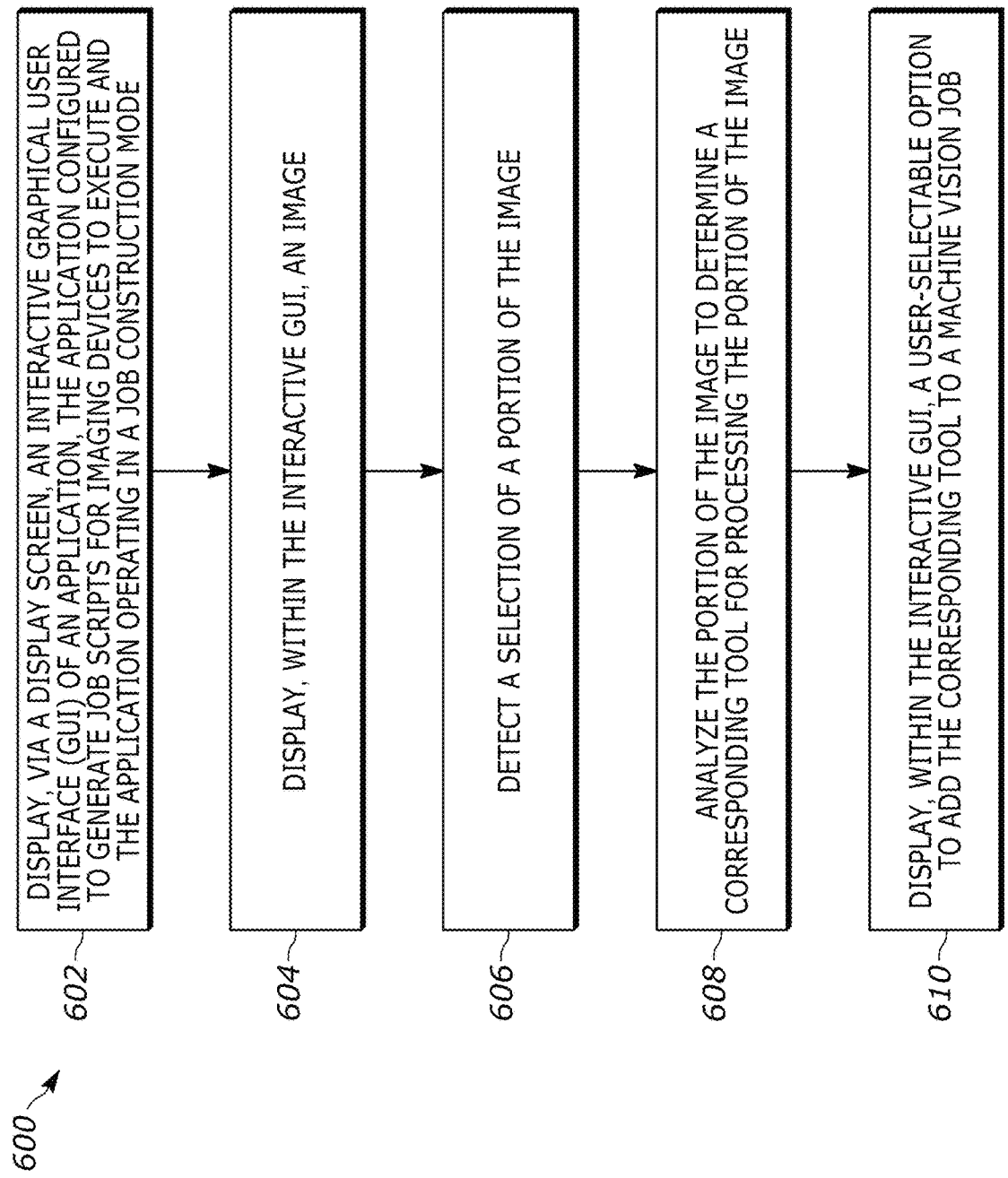
FIG. 6 is a flow diagram of an example method for facilitating selection of image analysis tools for a machine vision job, in accordance with embodiments described herein.

FIG. 6 is a flow diagram of an example method 600 for facilitating creation of a machine vision job. The method

600 may be implemented by one or more processors (e.g., the one or more processors 108 of the user computing device 102).

At block 602, the one or more processors may display, via a display screen (e.g., a display screen included in the I/O interface 114), an interactive GUI of an application (e.g., application interface 400, 420, or 500 of the smart imaging application 116). The application may be configured to generate job scripts for imaging devices (e.g., imaging device 104) to execute, as discussed above with reference to the smart imaging application 116. The application may be operating in a job construction mode (e.g., a mode of the application that enables the user to construct machine vision jobs).

At block 604, the one or more processors may display, within the interactive GUI, an image (e.g., a representative image as shown in the application interfaces 400, 420, and 500). At block 606, the one or more processors detect a selection of a portion of the image. For example, the one or more processors may detect a ROI indicated by the user on the image (e.g., the ROI 408, 508).

Next, at block 608, the one or more processors may analyze the portion of the image to determine a corresponding tool for processing the portion of the image. Analyzing the portion of the image to determine a tool corresponding to the image may include using pixel analysis, and may include image analysis techniques such as edge detection, pattern recognition, object detection, or the like. In addition, analyzing the portion of the image may include determining whether the portion of the image includes a barcode and, if so, determining that a corresponding tool is a barcode scanning tool. If the portion of the image does not include a barcode, then the method may include determining that a corresponding tool is a different tool such as a pattern matching tool, edge detection tool, semantic segmentation tool, object detection tool, or object tracking tool.

Further, analyzing the portion of the image may include performing edge detection. For example, analyzing the portion of the image may include detecting at least one edge within the portion of the image and, in response, determining that the corresponding tool is an edge detection tool. As another example, analyzing the portion of the image may include determining that the portion of the image includes a two- or three-dimensional object (e.g., by performing edge detection or other suitable image analysis technique). In response to determining that the image depicts a two-dimensional object, the method may include determining that the corresponding tool is an edge detection tool. In response to determining that the image depicts a three-dimensional object, the method may include determining that the corresponding tool is a pattern matching tool.

At block 610, the one or more processors display, within the interactive GUI, a user-selectable option to add the corresponding tool to a machine vision job (e.g., a user-selectable option for the recommended tool 514). If the one or more processors detect a selection of the user-selectable option, then the one or more processors may add the corresponding tool to a job flow of the machine vision job and display the corresponding tool within the job flow (e.g., within the job flow builder section 504 of the job construction application interface 500). Further, the interactive GUI may include a user-selectable option to deploy the machine vision job (e.g., the job deployment toggle 512). If the one or more processors detect a selection of the user-selectable option to deploy the machine vision job, then the one or more processors may generate a job script that an imaging device (e.g., imaging device 104) can execute to perform the machine vision job. The job script may include computer-readable instructions corresponding to tools within the job flow, including the corresponding tool.

Additionally, it is to be understood that each of the actions described in the method 600 may be performed in any order, number of times, or any other combination(s) therein suitable to facilitate selection of image analysis tools for a machine vision job. For example, some or all of the blocks of the method 600 may be fully performed once, multiple times, or not at all.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method for facilitating selection of tools for one or more machine vision jobs, the method comprising:
displaying, by one or more processors via a display screen, an interactive graphical user interface (GUI) of an application, the application configured to generate job scripts for imaging devices to execute and the application operating in a job construction mode;
displaying, by the one or more processors within the interactive GUI, an image;
detecting, by the one or more processors, a selection of a portion of the image;
analyzing, by the one or more processors, the portion of the image to determine a corresponding tool for processing the portion of the image; and
adding the corresponding tool to a job flow of the machine vision job.

2. The method of claim 1, further comprising:
displaying, by the one or more processors within the interactive GUI, the corresponding tool within the job flow.

3. The method of claim 2, further comprising:
detecting, by the one or more processors, a selection of a user-selectable option to deploy the machine vision job;
in response to detecting the selection of the user-selectable option, generating a job script an imaging device can execute to perform the machine vision job, the job script including computer-readable instructions corresponding to tools within the job flow, wherein the tools include the corresponding tool; and
transmitting the job script to the imaging device for execution.

4. The method of claim 1, wherein analyzing the portion of the image includes:
analyzing the portion of the image using pixel analysis.

5. The method of claim 1, wherein analyzing the portion of the image includes:
determining whether the portion of the image includes a barcode.

6. The method of claim 5, wherein analyzing the portion of the image includes:
in response to determining that the portion of the image includes a barcode, determining that the corresponding tool corresponds to a barcode scanning tool.

7. The method of claim 5, wherein analyzing the portion of the image includes:
in response to determining that the portion of the image does not include a barcode, determining that the corresponding tool corresponds to at least one of a pattern matching tool or an edge detection tool.

8. The method of claim 1, wherein analyzing the portion of the image includes:
detecting at least one edge within the portion of the image; and
in response to detecting the at least one edge, determining that the corresponding tool corresponds to an edge detection tool.

9. The method of claim 1, wherein analyzing the portion of the image includes:
performing edge detection on the portion of the image; and
in response to determining, based on the edge detection, that the image depicts a two-dimensional object, determining that the corresponding tool corresponds to an edge detection tool.

10. The method of claim 1, wherein analyzing the portion of the image includes:
performing edge detection on the portion of the image; and
in response to determining, based on the edge detection, that the image depicts a three-dimensional object, determining that the corresponding tool corresponds to a pattern matching tool.

11. A computer system for facilitating selection of tools for one or more machine vision jobs, the computer system comprising:
one or more processors; and
a non-transitory program memory communicatively coupled to the one or more processors and storing executable instructions that, when executed by the one or more processors, cause the computer system to:
display, via a display screen, an interactive graphical user interface (GUI) of an application, the application configured to generate job scripts for imaging devices to execute and the application operating in a job construction mode;
display, within the interactive GUI, an image;
detect a selection of a portion of the image;
analyze the portion of the image to determine a corresponding tool for processing the portion of the image; and
add the corresponding tool to a job flow of the machine vision job.

12. The computer system of claim 11, wherein the instructions further cause the computer system to:
display, within the interactive GUI, the corresponding tool within the job flow.

13. The computer system of claim 12, wherein the instructions further cause the computer system to:
detect a selection of a user-selectable option to deploy the machine vision job;
in response to detecting the selection of the user-selectable option, generate a job script an imaging device can execute to perform the machine vision job, the job script including computer-readable instructions corresponding to tools within the job flow, wherein the tools include the corresponding tool; and transmitting the job script to the imaging device for execution.

14. The computer system of claim 11, wherein the instructions cause the computer system to analyze the portion of the image by analyzing the portion of the image using pixel analysis.

15. The computer system of claim 11, wherein the instructions cause the computer system to analyze the portion of the image by determining whether the portion of the image includes a barcode.

16. The computer system of claim 15, wherein the instructions cause the computer system to analyze the portion of the image by, in response to determining that the portion of the image includes a barcode, determining that the corresponding tool corresponds to a barcode scanning tool.

17. The computer system of claim 15, wherein the instructions cause the computer system to analyze the portion of the image by, in response to determining that the portion of the image does not include a barcode, determining that the corresponding tool corresponds to at least one of a pattern matching tool or an edge detection tool.

18. The computer system of claim 11, wherein the instructions cause the computer system to analyze the portion of the image by:
performing edge detection on the portion of the image; and
in response to determining, based on the edge detection, that the image depicts a two-dimensional object, determining that the corresponding tool corresponds to an edge detection tool.

19. The computer system of claim 11, wherein the instructions cause the computer system to analyze the portion of the image by:
performing edge detection on the portion of the image; and
in response to determining, based on the edge detection, that the image depicts a three-dimensional object, determining that the corresponding tool corresponds to a pattern matching tool.

20. A tangible, non-transitory computer-readable medium storing executable instructions for facilitating selection of tools for one or more jobs that, when executed by at least one processor of a computer system, cause the computer system to:
display, via a display screen, an interactive graphical user interface (GUI) of an application, the application configured to generate job scripts for imaging devices to execute and the application operating in a job construction mode;
display, within the interactive GUI, an image;
detect a selection of a portion of the image;
analyze the portion of the image to determine a corresponding tool for processing the portion of the image; and
add the corresponding tool to a job flow of a machine vision job.

* * * * *